United States Patent [19]
Dietz

[11] 4,129,364
[45] Dec. 12, 1978

[54] FILM PROJECTOR
[75] Inventor: Bernhard Dietz, Cologne, Germany
[73] Assignee: Bruno Albrecht KG, Duesseldorf, Germany
[21] Appl. No.: 789,664
[22] Filed: Apr. 21, 1977
[30] Foreign Application Priority Data
  Apr. 23, 1976 [DE] Fed. Rep. of Germany ....... 2617799
[51] Int. Cl.$^2$ .............................................. G03B 21/28
[52] U.S. Cl. ...................................... 353/99; 353/119
[58] Field of Search ................. 353/82, 21, 71, 98, 353/99, 119

[56] References Cited
U.S. PATENT DOCUMENTS

| 2,074,991 | 3/1937 | Salcedo | 353/82 |
| 2,120,596 | 6/1938 | Avey | 353/21 |
| 3,447,869 | 6/1969 | Szymber | 353/71 |

Primary Examiner—Steven L. Stephan
Attorney, Agent, or Firm—Haseltine, Lake, & Waters

[57] ABSTRACT

An arrangement for projecting film pictures in which a system of lenses are provided on the side of a window facing the light source. A first mirror in the light beam projected by the lens system, forms an angle with the axis of the light beam. The first mirror is rotated about the axis of the light beam, and a second mirror is located in the light beam deflected by the first mirror, at a first rotated position of the first mirror. The plane of the second mirror forms an angle of substantially 45° with the plane of the first mirror located in the first rotated position. A third mirror is located in a second rotated position of the first mirror in the light beam deflected by the first mirror. The plane of the third mirror forms an angle of substantially 45° with the plane of the first mirror when located in the second rotated position.

5 Claims, 6 Drawing Figures

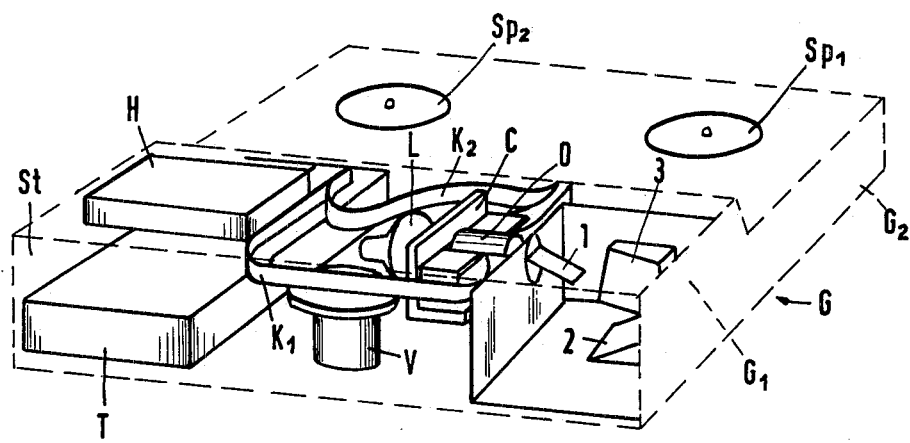
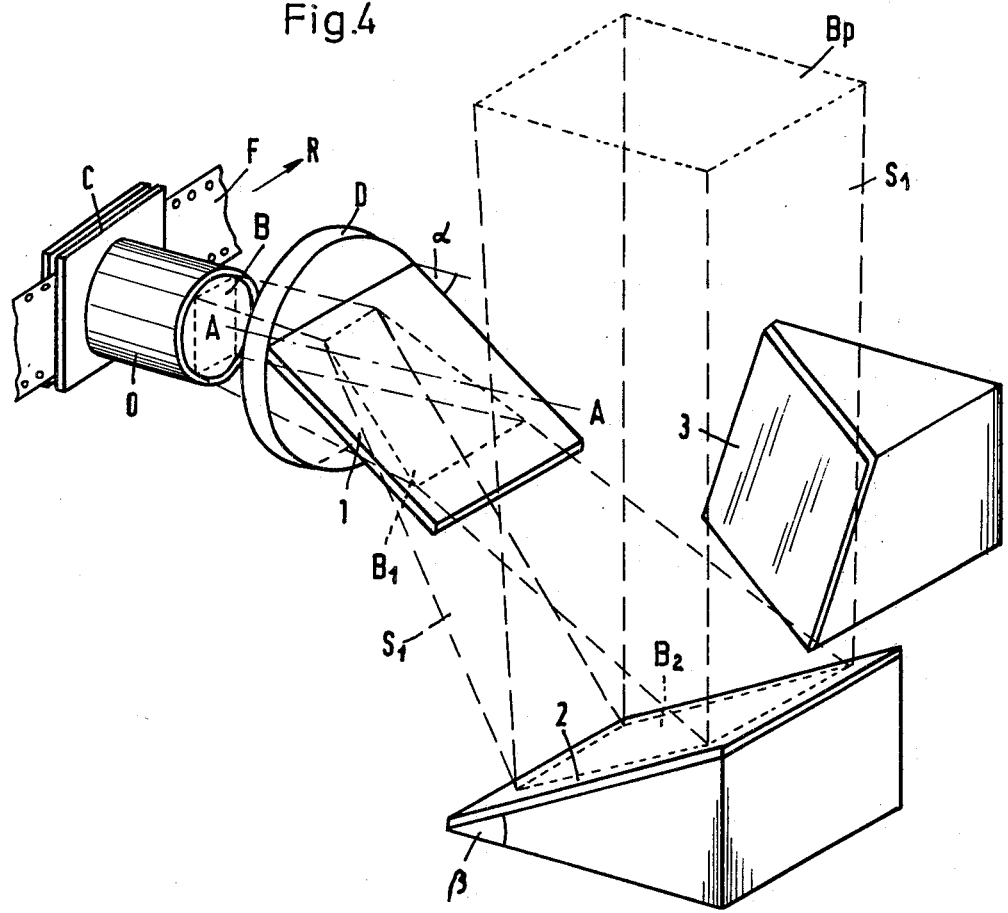

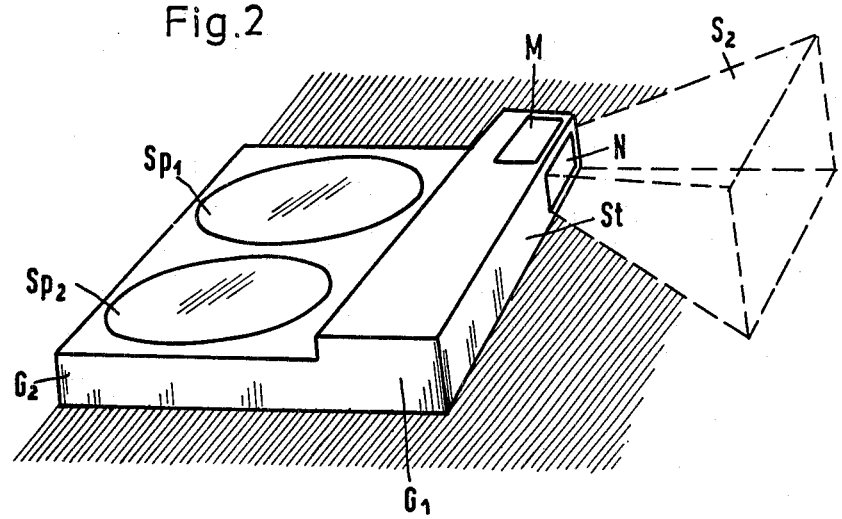
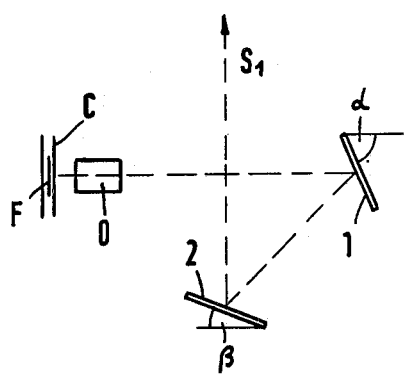
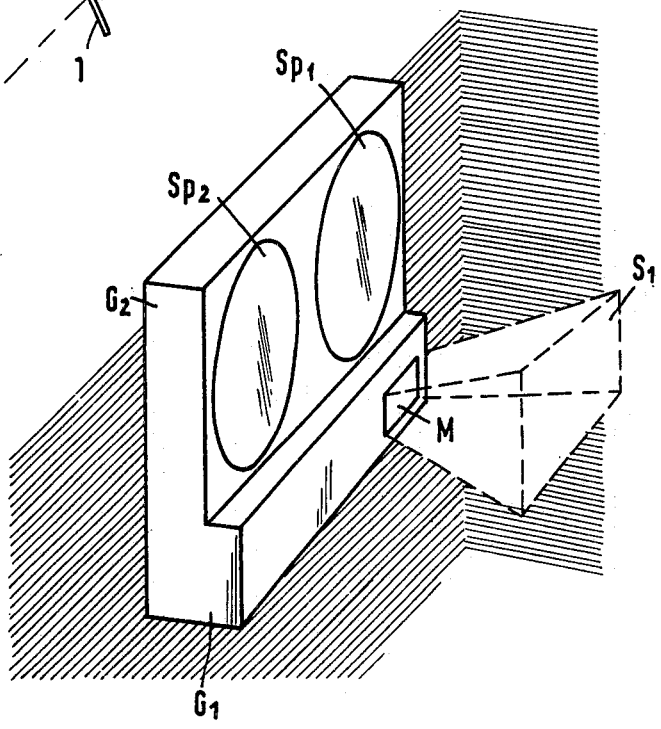

FILM PROJECTOR

The invention relates to a film projector, particularly a portable film projector. The object of the invention is to provide a film projector such that the film pictures can be projected with it on a remote screen unreversed with two different positions of the window 90° apart in which the film is illuminated for projection. Thus the invention relates to a film projector with which the images can be projected in the same manner whether the surrounding housing is upright or sideways.

The invention can be used particularly with film projectors which, in a manner already known in the art, have a portable housing with a thicker portion in which the film gate (image window), the projection lens and the projection lamp are located, and a part of lesser thickness which contains the shafts for the film reels, with the thicker part of the housing having a window on the base surface of the projector for passing the projection beam and a window on the surface perpendicular to it.

BRIEF DESCRIPTION OF THE DRAWINGS

The drawing contains an embodiment of a projector in accordance with the invention.

FIG. 1 shows a perspective drawing of such a projector with housing shown in phantom.

FIGS. 2 and 3 show a perspective drawing of such a projector in two different positions.

FIGS. 4 and 5 show an arrangement of the mirrors with two different paths of the projection beam; and FIG. 6 shows a schematic of another mirror arrangement.

DESCRIPTION OF THE PREFERRED EMBODIMENTS

Figure 5:
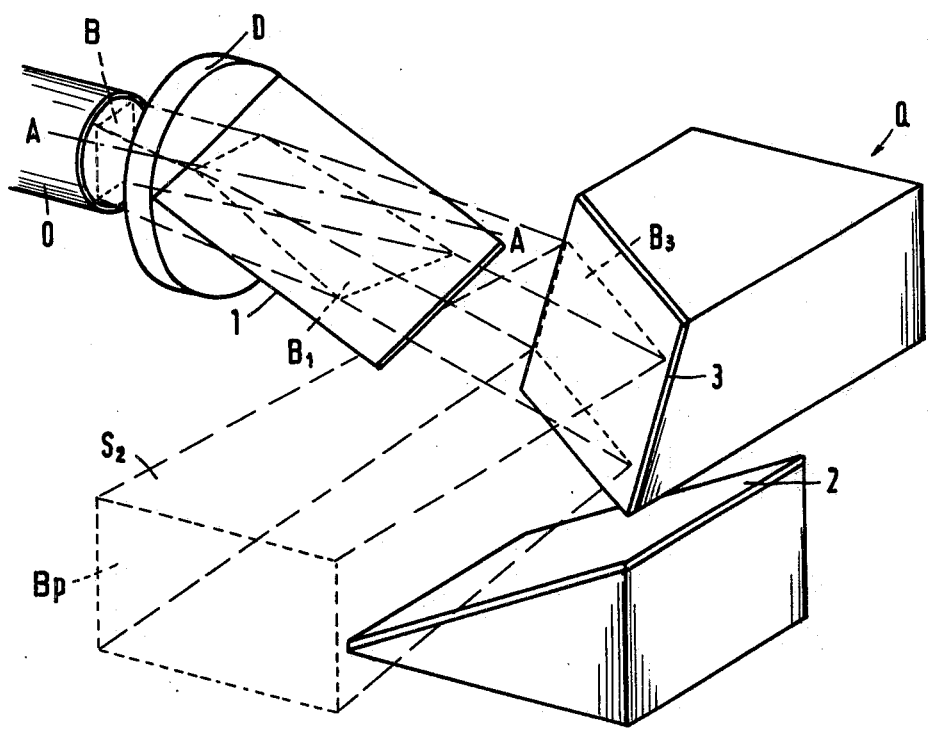

The housing of the projector shown as an embodiment has a part G1 which has a greater thickness throughout the entire length of the projector and whose front side St can be used as base surface of the projector (see FIG. 3). In the housing portion G1 are the projection lamp L, the film gate C with the associated means for transporting the film through the film gate, guide channels K1, K2 for the film, a cooling fan V, the projection optics system O, three mirrors 1, 2, a panel H containing the operational controls and an area T for possibly holding a sound reproduction device, e.g., a device with a tape cassette which is synchronized with the film transport. Portion G2 of the housing, attached to portion G1 contains the shafts for the film reels Sp1 and Sp2 and the mechanism (not shown) for driving these reels.

Contrasting with conventional film projectors, the gate through which the projection beam leaves the housing is not located on the axis of optical system O; instead, the housing on its base surface St has a window N, and a window M on the topside of housing portion G1 for projection beam S2 or S1, resp. (FIGS. 2 and 3).

Three mirrors 1, 2, 3 are located on the projection side of optical system O. Mirror 1 is fastened to a body D rotatable about the axis A—A of the optical system. When the mirror 1 is rotated to the position shown in FIG. 4, it directs the projection beam S1 to the mirror 2 from which the projection beam S1 exits from housing G through a window M provided in the housing of the projector base surface. Mirror 1 is tipped by an angle α with respect to a plane which is perpendicular to the plane assumed by film F in the film gate C and which is in the travel direction R of the film F, towards mirror 2. Mirror 2 is inclined at an angle β with respect to the plane mentioned towards mirror 1. The sum of the angles α + β, hence the angle between the planes of mirror 1 and 2 is 45°. The size of the individual angles α and β may be between 15° and 30° and is preferably near 22.5°. In FIG. 4, the virtual image to be projected is denoted at the objective exit by B, on the mirror 1 by B1, on mirror 2 by B2 and in the exiting projection beam S1 by BP.

After the mirror 1 has been rotated by means of body D to the position shown in FIG. 5, its projection beam strikes mirror 3. The plane of mirror 3 makes with the plane of the mirror 1 thus turned, an angle of about 45° so that the projection beam S2 of mirror 3 makes a right angle with projection beam S1 of mirror 2. The housing of the projector has a window N which is along projection beam S2. Hence, in accordance with the rotation of mirror 1, the projection beam either exits from window M or window N (FIGS. 2 and 3). The projector shown, therefore, can be alternatively used in the lying position (FIG. 2) or in the upright position (FIG. 3). It may also be suspended in the position shown in FIG. 3. The projector can also be installed in a lying or upright position.

The mirror 3 can be shifted in the direction of arrow Q from the region of projection beam S1 projected on mirror S2 when the mirror 1 is rotated, so that it directs the projection beam onto mirror 2. The device D for rotating mirror S1 and the device for shifting mirror 3 may be coupled with each other in such a way that both motions can be effected in one manual operation.

The arrangement of mirrors 1 and 2 of FIG. 6 differs from the arrangement of mirrors 1 and 2 of FIG. 4 in that the angle α by which the mirror is inclined from the horizontal, is much greater and that the sum of angles α and β is about 90°. Also here the planes of the two mirrors include an angle of 45°.

I claim:

1. Arrangement for projecting film pictures comprising the following: a light source, a window, means for moving a film containing pictures through the window, a system of lenses on the side of the window opposite the light source, a first mirror in the light beam projected by the lens system, said first mirror forming an angle with the axis of the light beam, means for rotating the first mirror about the axis of the light beam, a second mirror which at a first rotated position of the first mirror is located in the light beam deflected by the first mirror and whose plane makes an angle of substantially 45° with the plane of the first mirror located in the first rotated position, a third mirror located in the light beam projected by the first mirror when the first mirror is turned in a second rotated position, the plane of the third mirror forming an angle of substantially 45° with the plane of the first mirror.

2. Arrangement according to claim 1 wherein the projection direction of the second mirror forms an angle of 90° with the projection direction of the third mirror.

3. Arrangement according to claim 1 including means for moving the third mirror in the area of the projection beam of the second mirror.

4. Arrangement according to claim 3 wherein said means for rotating said first mirror is coupled with said means for moving the third mirror.

5. Arrangement according to claim 1 where the aforementioned parts are contained in a housing having a thicker portion with a base surface, a window at the base surface on a surface of the thickened portion perpendicular thereto, one of the windows being located in the projection beam of the second mirror and the other window being located in the projection beam of the third mirror.

* * * * *